US012626442B2

(12) United States Patent
    Aizawa

(10) Patent No.: US 12,626,442 B2
(45) Date of Patent: May 12, 2026

(54) 3D OBJECT MANAGEMENT DATA, COMPUTER PROGRAM, AND DISTRIBUTED MANAGEMENT METHOD FOR 3D OBJECT

(71) Applicant: AIZAWA INSTITUTE OF TECHNOLOGY INC., Sapporo (JP)

(72) Inventor: Taishi Aizawa, Sapporo (JP)

(73) Assignee: AIZAWA INSTITUTE OF TECHNOLOGY INC., Sapporo (JP)

( * ) Notice: Subject to any disclaimer, the term of this patent is extended or adjusted under 35 U.S.C. 154(b) by 178 days.

(21) Appl. No.: 18/548,197

(22) PCT Filed: Jun. 9, 2022

(86) PCT No.: PCT/JP2022/023379
    § 371 (c)(1),
    (2) Date: Aug. 28, 2023

(87) PCT Pub. No.: WO2022/264923
    PCT Pub. Date: Dec. 22, 2022

(65) Prior Publication Data
    US 2024/0144576 A1     May 2, 2024

(30) Foreign Application Priority Data
    Jun. 17, 2021    (JP) ................................ 2021-101128

(51) Int. Cl.
    *G06T 15/00*        (2011.01)
    *H04L 9/00*         (2022.01)
    *H04L 9/32*         (2006.01)

(52) U.S. Cl.
    CPC ............ *G06T 15/00* (2013.01); *H04L 9/3236* (2013.01); *H04L 9/50* (2022.05)

(58) Field of Classification Search
    None
    See application file for complete search history.

(56) References Cited

U.S. PATENT DOCUMENTS 6,732,170 B2 *   5/2004   Miyake ................... H04L 41/22
                                                         709/224
11,079,897 B2    8/2021   Yerli
                        (Continued)

FOREIGN PATENT DOCUMENTS

| CN | 112330159 A | 2/2021 |
| JP | 2006-059362 A | 3/2006 |
| JP | 2020-166516 A | 10/2020 |

OTHER PUBLICATIONS

International Search Report and Written Opinion Received for PCT/JP2022/023379, mailed Aug. 16, 2022.

*Primary Examiner* — Kee M Tung
(74) *Attorney, Agent, or Firm* — Greer, Burns & Crain, Ltd

(57) ABSTRACT
A data structure for 3D object management data used for displaying images of digitized 3D objects is disclosed.
The data structure includes a registrant identification code to identify the registrant of the 3D object, an object type number specifying the type of the 3D object, an object serial number assigned to the 3D object whose type has been specified in sequential order of registration, a storage number to specify a storage means storing 3D data to specify a 3D shape of the 3D object to be registered, geodetic position data to specify a current position of the 3D object to be registered, orientation data to indicate the direction of the 3D object, and updated date and time of the 3D data. The 3D data is acquired from a blockchain, in which the 3D object management data is recorded, using an inputted geodetic position to generate and display relevant 3D images.

2 Claims, 10 Drawing Sheets

(56)     References Cited

U.S. PATENT DOCUMENTS

| | | | |
|---|---|---|---|
| 2013/0031221 A1* | 1/2013 | Tian | G06F 3/0631 |
| | | | 709/219 |
| 2020/0201330 A1* | 6/2020 | Shashua | G05D 1/0219 |
| 2020/0402187 A1* | 12/2020 | Yerli | G06Q 10/06313 |
| 2020/0404218 A1* | 12/2020 | Yerli | G06T 7/70 |

* cited by examiner

FIG. 5

Example of data structure for 3D object management data

401

| Geodetic location (longitude, latitude, elevation) | Object Type Number | Object Serial Number | Direction | Storage No. | Registrant Identification Code | Latest updated date/time |
|---|---|---|---|---|---|---|
| 139.7664811, 35.6806923, 3.3 | B12W135H002 | 000010 | 82 | SAS012024 | 123456 | 202004061102 |
| 139.7664800, 35.6806824, 5.2 | B45W223H125 | 000003 | 204 | 100WD537 | 567890 | 202004061147 | hashed →

Example of data structure of 3D data stored in a distributed file system

402

| Hash value corresponding to a portion of 3D object management data | Object Type Number | 3D data itself |
|---|---|---|
| 26e135f8700····2000 | B12W135H002 | ·········· |
| a45b8422312····5000 | B45W223H125 | ·········· |

Example data structure of 3D object management data recorded in the blockchain

403

| Geodetic location (longitude, latitude, elevation) | Object Type Number | Object Serial Number | Direction | Storage No. | Registrant Identification Code | Latest updated date/time | Hash value corresponding to a portion of 3D object management data |
|---|---|---|---|---|---|---|---|
| 139.7664811, 35.6806923, 3.3 | B12W135H002 | 000010 | 82 | SAS012024 | 123456 | 202004061102 | 26e135f8700····2000 |
| 139.7664800, 35.6806824, 5.2 | B45W223H125 | 000003 | 204 | 100WD537 | 567890 | 202004061147 | a45b8422312····5000 |

FIG. 7
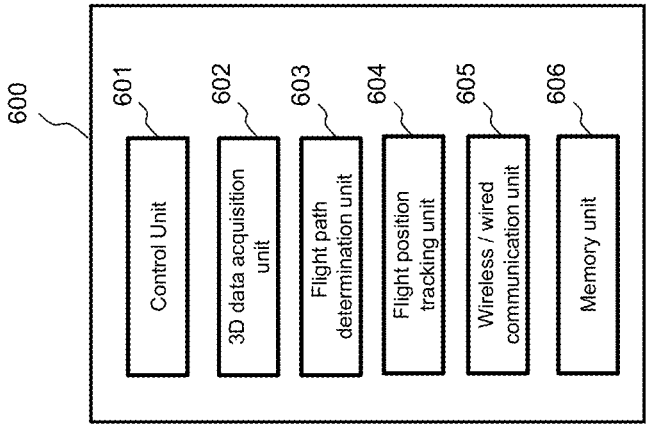
600
601 Control Unit
602 3D data acquisition unit
603 Flight path determination unit
604 Flight position tracking unit
605 Wireless / wired communication unit
606 Memory unit
7 Wireless Network
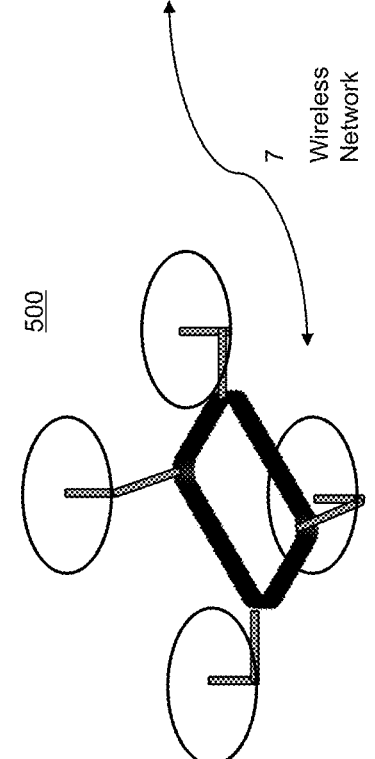
500

3D OBJECT MANAGEMENT DATA, COMPUTER PROGRAM, AND DISTRIBUTED MANAGEMENT METHOD FOR 3D OBJECT

BACKGROUND

The present invention relates to 3D object management data, computer programs, and methods for the management of 3D objects. In particular, the present invention relates to 3D object management data used to manage 3D objects wherein the objects are synchronized with the real world, computer programs that use the 3D object management data, and methods for distributed management of 3D objects.

Mirror worlds have been advocated as a next-generation platform in the technology field. In line with this, discussions as to how to apply mirror worlds to the solution of social issues and economic development have started with some progress. The mirror world synchronizes the objects of the real world (physical world) including people, things, and buildings with a digital twin (digital world), which is a real-time copy of the objects of the real world by 3D objects. This technology is expected to have a significant impact on the future development of society.

It is undesirable for a specific company or organization to centrally manage and operate 3D objects representing a vast number of real objects located on the earth, in view of security and other concerns regarding information, including reliability, authenticity, and public benefit. There is a need for an open and reliable structure to manage 3D objects, which anyone can use and verify.

For example, Patent Document 1 (Japanese Unexamined Patent Application Publication No. 2020-017264) discloses a system and method that enable two-way interactive operation of real-time 3D virtual objects in a real-time 3D virtual world that represents the real world. The method enables two-way interactive operation between a real object connected to a real-time 3D virtual replica through a network and a user device connected to the real object through a network, via a persistent virtual world system stored and computed on a server.

In the technology described in Patent Document 1, however, the persistent virtual world system is pre-stored and computed on a specific server. The real-time 3D virtual replicas of the real objects operated in this system are provided by the owners of the real objects to administrators of the persistent virtual world system, and the administrators of the persistent virtual world system, government officials, or other relevant authorities collaborate with owners of real objects to input the real-time 3D virtual replicas into the persistent virtual world system. The technology of Patent Document 1, therefore, fails to provide solutions to the previously-mentioned problems concerning data management.

PRIOR-ART DOCUMENT

Patent Document

Patent Document 1: Japanese Unexamined Patent Application Publication No. 2020-017264

SUMMARY

Problems to be Solved by the Invention

The present invention was made in consideration of the previously-mentioned conventional problems. An object of the present invention is to provide 3D object management data, a computer program, and a method for distributed management of 3D objects that are managed in a distributed manner by a plurality of computers, which are used to reproduce on a computer (on a screen of a display device), and three-dimensional (3D) shapes that are formed by synchronizing 3D objects digitized from the physical solids in the real world with 3D objects created on a computer at a geodetic position that corresponds to the position of the real world.

A data structure to achieve the previously-mentioned object, according to one embodiment of the invention, is the data structure of 3D object management data managed in a distributed manner by a plurality of computers, the 3D object management data being used such that a 3D object digitized from a physical solid in the real world and a 3D object created on a computer are displayed as images so that the former and the latter are synchronized with the real world. The 3D object management data includes a registrant identification code to identify a registrant of the 3D object digitized from a physical solid in the real world or the 3D object created on a computer, an object type number to specify a type of a 3D object to be registered, an object serial number assigned to a 3D object whose type has been specified in sequential order of registration, a storage number to specify a storage means storing 3D data to specify a 3D shape of the 3D object to be registered, geodetic position data to specify a current position of the 3D object to be registered, orientation data to indicate a direction in which the 3D object to be registered is facing, and data of updated date and time for the 3D object to be registered. The 3D object management data is recorded in a predetermined blockchain with the geodetic position data as a search key, each of the plurality of computers forming the blockchain as a node, and if a geodetic position is inputted into the blockchain as a search key, the 3D object management data corresponding to the inputted geodetic position is acquired from the blockchain, and a storage means storing 3D data to specify a 3D shape of a 3D object is specified based on the acquired 3D object management data, so that the 3D object management data is used to generate a 3D image of a 3D object located at the inputted geodetic position by using the 3D data acquired from the specified storage means, and to display the 3D image on a display device.

The 3D object management data may be generated by any one of the plurality of computers, and the 3D data to specify a 3D shape of the 3D object may be associated with the 3D object management data, at least a portion excluding the geodetic position data thereof being hashed, to be stored in a storage means managed in a distributed manner separately from the blockchain. The 3D object digitized from a physical solid in the real world may include a moving body and a fixed object.

A computer program to achieve the previously-mentioned object according to one embodiment of the invention is the program for causing a computer to generate 3D images using 3D object management data having the previously-mentioned data structure. The program causes the computer to perform the following functions: based on an inputted geodetic position, searching the blockchain in which the 3D object management data having the data structure is recorded; acquiring 3D object management data from the blockchain, the data being for a point located within a certain predetermined fixed range from the inputted geodetic position; specifying a storage means in which 3D data to specify a 3D shape of a 3D object associated with the 3D object management data is stored; acquiring 3D data to specify the 3D shape of the 3D object from the specified storage means; and generating a 3D image of a 3D object located within a certain range from the inputted geodetic position based on the 3D data to specify the 3D shape of the 3D object acquired from the storage means and the 3D object management data acquired from the blockchain.

A method to manage 3D objects by distributed management using a plurality of computers to achieve the previously-mentioned object according to one embodiment of the invention is the method that includes the following steps: by any one of the plurality of computers, preparing 3D data to specify a 3D shape of a 3D object digitized from a physical solid in the real-world, or a 3D shape of a 3D object created on a computer, generating 3D object management data to be associated with the prepared 3D data, calculating a hash value by applying a predetermined hash function to a portion of the 3D object management data, adding the calculated hash value to the 3D object management data to record said data in a blockchain formed by the plurality of computers, and associating the other portion of the 3D object management data to which the hash function is not applied and the calculated hash value with the 3D data to store said 3D data in a predetermined storage means managed in a distributed manner separately from the blockchain. The 3D object management data includes a registrant identification code to identify a registrant of the 3D object to be registered in the blockchain, an object type number to specify a type of the 3D object to be registered, an object serial number assigned to a 3D object whose type has been specified in sequential order of registration; a storage number to specify a storage means storing 3D data to specify a 3D shape of the 3D object to be registered, geodetic position data to specify a current position of the 3D object to be registered, orientation data to indicate a direction in which the 3D object to be registered is facing, and data of updated date and time of the 3D object to be registered. The blockchain is a blockchain of a predetermined type, in which each of the plurality of computers serves as a node, and the implementation of the blockchain is performed by a data processing application that is provided to each of the plurality of computers, wherein the 3D object management data is registered in the blockchain, the geodetic position data serving as a search key, and the other part of the 3D object management data to which the hash function is not applied includes geodetic position data.

The invention reduces the amount of data processing and data communication required to search for and acquire 3D data of 3D objects stored in a distributed manner on many computers. The invention also significantly reduces the amount of data processing required for updating and registering 3D data of 3D objects managed in a distributed manner at the overall level of the distributed management system.

The computer program according to the invention can efficiently generate 3D images based on the latest information of an area that is within a certain range from a specified point based on the 3D object management data having the data structure of the invention.

Furthermore, according to the method for distributed management of 3D objects, the update records of 3D data of 3D objects managed in a distributed manner are publicly managed, which enables data management that provides reliability and authenticity.

BRIEF DESCRIPTION OF THE DRAWINGS

FIG. 5 shows an example of the data structure of 3D object management data according to one embodiment of the invention.

FIG. 7 is a diagram that shows an example configuration of a drone flight management system in another application of 3D object management data according to one embodiment of the invention.

DETAILED DESCRIPTION

Examples of embodiments for implementing the invention will be described in detail as follows, with reference to the drawings.

First, an example configuration will be described of a 3D object distributed management system according to one embodiment of the invention.

Three-dimensional (3D) data is digital data that specifies the three-dimensional shape of an object, and there are various types of data as 3D data. For example, 3D data obtained by a 3D scanner that measures the 3D shape of an object is point cloud data of the surface of the object, and 3D data outputted from software such as 3D CAD software that generates 3D shapes on a computer is modeling data such as data from CAD systems and data from Building Information Modeling (BIM) models. Also, devices to output 3D data have been developed, which include 3D display devices for Virtual Reality (VR) and Mixed Reality (MR), and 3D modeling devices such as 3D printers.

The 3D object distributed management system according to one embodiment of the present invention is configured as follows: (1) in order to record 3D objects (physical solids and models) represented in various forms of 3D data handled by various devices, "3D object management data" having the data structure according to the present invention is generated and recorded in a prescribed blockchain, which serves as a distributed management ledger of the 3D objects; and (2) the 3D data itself that specifies (represents) the 3D shape of the 3D objects is stored by distributed management in a distributed file system formed by multiple computers as a separate system from the previous blockchain or is stored in a prescribed storage means. In the 3D object distributed management system according to this embodiment, unique 3D object management data having a data structure according to the present invention, which corresponds to each 3D object to be registered, is generated, and the generated data is associated with the corresponding 3D object. The 3D object management data associated with the 3D object has the data structure described later, which includes at least object identification information and geodetic location information. Because of such a data structure, a user who wants to use the 3D object distributed management system according to the invention can acquire and utilize 3D data that specifies the current (i.e., latest) 3D shape of a 3D object located within a certain range from the specified point, simply by specifying a desired geodetic location.

Figure 1:
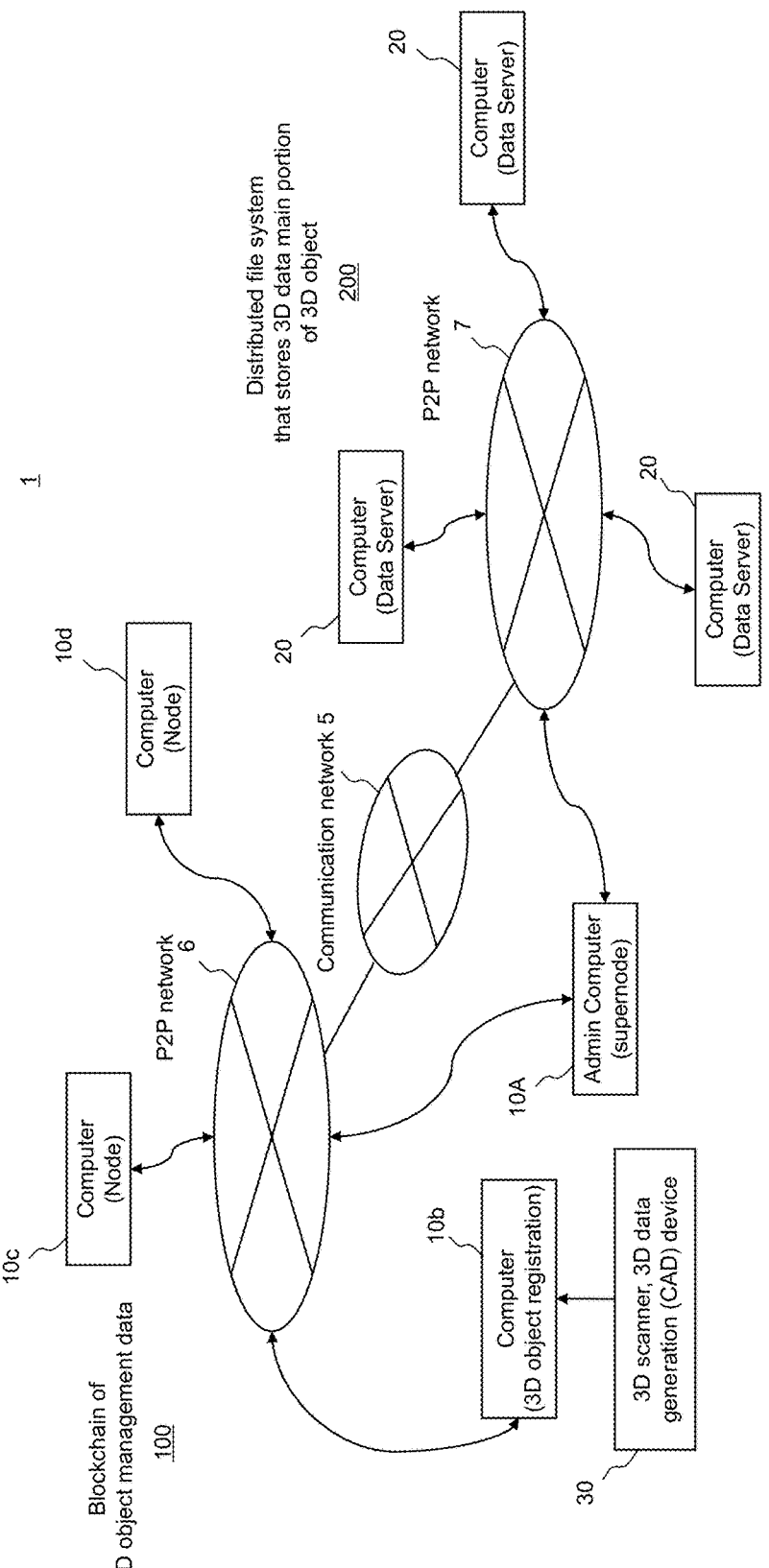
FIG. 1 is a schematic diagram of the overall structure of a 3D object distributed management system according to one embodiment of the invention.

FIG. 1 is a schematic diagram of the overall structure of a 3D object distributed management system according to one embodiment of the invention.

Referring to FIG. 1, the 3D object distributed management system 1 according to one embodiment of the invention includes a plurality of computers (hereinafter "nodes") (10A, 10*b*-10*d*) that forms a predetermined blockchain platform 100 to record 3D object management data (hereinafter "blockchain of 3D object management data"), and a plurality of computers 20 (for example, a group of data servers) that forms a distributed file system 200 storing 3D data to specify (represent) the 3D shape of 3D objects associated with the 3D object management data (hereinafter "3D data itself"), in which the nodes (10A, 10*b*-10*d*) and computers 20 are connected through a communication network 5 such as the Internet so that they can communicate with each other. The data format and data structure of the 3D data itself are not particularly limited. The storage means on which the 3D data itself is stored is not limited to distributed file systems.

In the 3D object distributed management system 1, each node (10A, 10*b*-10*d*) is a computer of a user, forming the blockchain 100 of 3D object management data, which manages the change history of 3D objects and exchanges the 3D data itself of the 3D objects by using the 3D object distributed management system 1. By executing a predetermined data processing application on each of these computers, the implementation of a predetermined blockchain in which each of these computers serves as a node is performed. Some of these nodes may be set as a supernode 10A, which is responsible for the management of the blockchain 100 of 3D object management data (hereinafter, the nodes other than the supernodes are referred to as "general nodes").

The supernode 10A (also called an administrator computer) is, for example, a computer operated by a managing member of the 3D object distributed management system 1 to perform the following processing: registering a new node that wants to use this system; generating 3D object management data for 3D objects provided by users (general nodes), which is to be registered to the blockchain, to record the data in the blockchain of 3D object management data; associating the generated 3D object management data with the 3D data itself of the 3D data to be registered; and storing the data on a group of computers (data servers) that form (i.e., configure) the operating environment of the distributed file system.

The group of computers 20 that configure the operating environment of the distributed file system form the nodes, which are distributed servers that constitute a distributed file system of, for example, Inter Planetary File System (IPFS).

A user who wants to register and/or use 3D data itself by using 3D object distributed management system 1 accesses the supernode 10A to download from the supernode 10A a predetermined application program, which enables the user to use each function of this system on the user's computer, and installs the program on the user's computer. Then, the user executes the installed application program to register user information and obtain his/her unique user ID (registrant identification code). The supernode 10A is provided with a correspondence table, which stores information on the correspondence relationship linking the user ID to the blockchain that is assigned to the user (general node).

Figure 2:
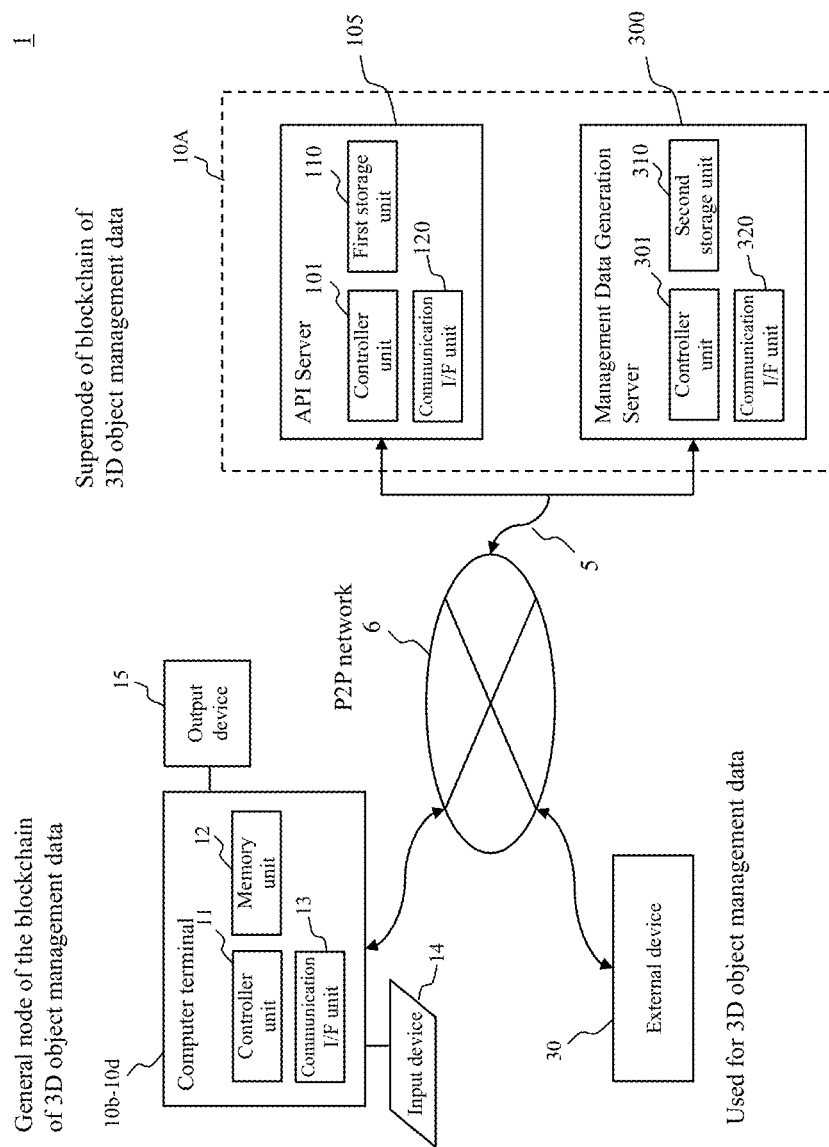
FIG. 2 is a schematic diagram of an example hardware configuration of a general node and a supernode of a 3D object distributed management system according to one embodiment of the invention.

FIG. 2 is a schematic diagram of an example hardware configuration of a general node and a supernode of a 3D object distributed management system according to one embodiment of the invention.

The general nodes (10*b*-10*d*) that form the blockchain 100 of 3D object management data are computers of users who use the 3D object distributed management system 1. Each general node includes a control unit 11, which has a central processing unit, ROM and RAM (not shown), executing predetermined programs for controlling with performing various data processing, a storage unit 12, which is formed by a storage device such as Solid State Drive (SSD) and Hard Disk Drive (HDD), and a communication interface (I/F) unit 13, through which the general node is connected to the other nodes and the servers 20 of the distributed file system 200.

The communication interface (I/F) unit 13 supports peer-to-peer (P2P) network connections (P2P network 6), through which the connection between one node with the other nodes is made, and enables the connection between a node and a P2P network 7, which is formed by the servers 20 of the distributed file system shown FIG. 1, via a communication network 5 such as the Internet.

Furthermore, the general node includes an input device 14 that receives commands from the user, and an output device 15, which is formed by a display means such as a display device, which displays an operation screen generated by the control unit 11 and 3D images generated based on 3D data itself received from the servers 20 and 3D object management data.

The computers that form the general nodes are not limited to personal computers, but mobile devices such as smartphones and tablets, and wearable devices having image display functions such as head-mounted displays (HMD) may be used. In this case, the input/output device is to be incorporated into each device in a variety of forms.

It is possible to provide the general node with an external device 30 such as a 3D scanner or a radar imaging device. It is also possible to configure such that the 3D object management data having the data structure described later is associated with the 3D data itself of the 3D object detected or generated by the external device 30 to record the 3D object management data in the blockchain 100 of 3D object management data.

The supernode 10A is a computer that performs the functions of an administrator computer, and may be formed by, for example, multiple computers that function as an API (application program interface) server 105 and a management data generation server 300.

The API server 105 is a server that provides an API, which allows a computer of a user who wants to newly use the 3D object distributed management system 1 according to this embodiment to be recorded in a node of the blockchain 100 recording 3D object management data, and the computer to use the blockchain of the 3D object management data. The API server 105 of the supernode 10A responds to an access from a new user's computer and sends to the new user's computer a predetermined application program (hereinafter "app") that allows the new user to use the functions of the system. The API is also implemented on the API server 105, which works with the apps run on the computers of general nodes to perform predetermined functions.

The API server 105 includes a control unit 101, which is formed by devices such as a central processing unit, ROM, and RAM (not shown), a first storage unit 110, which is formed by devices such as SSD, and HDD, and a communication interface (I/F) unit 120, through which the server 105 is connected to general nodes (10b-10d) and servers 20. The function of the communication interface (I/F) unit 120 is the same as that of the communication interface (I/F) unit 13 of a general node.

The API server 105 communicates with each node (10b-10d) via the P2P network 6 formed by, for example, the Internet, and with the management data generation server 300 via the Internet or a predetermined communication network to perform the following: requesting the administrative data generation server 300 to generate 3D object management data; recording the 3D object management data generated by the administrative data generation server 300 in the blockchain 100 of 3D object management data; and associating the 3D object management data, a portion of which is hashed, with the 3D data itself of the 3D object to be registered to store the data in the storage means of the distributed file system 200, the storage means being any one of the data servers 20. Details of the data processing by which a portion of the 3D object management data is hashed are described later.

The administrative data generation server 300 generates the 3D object management data in such a way that the server 300 performs, in conjunction with the API server 105, operations such as data extraction and format conversion on the 3D data itself of the 3D object to be registered received from general nodes, the operations being required for storing the 3D object management data in the blockchain 100.

The administrative data generation server 300 includes a control unit 301, which is formed by devices such as a central processing unit, ROM, and RAM (not shown), a second storage unit 310 that stores various data and programs used in generating 3D object management data, and a communication interface (I/F) unit 320, through which the server 300 is connected to the general nodes (10b-10d) and the API server 105.

The second storage unit 310 of the administrative data generation server 300 stores a data table for object discrimination used to specify a real thing or a model that the 3D data itself of the 3D object to be registered represents. When the administrative data generation server 300 receives a new request for registration of a 3D object from a general node (10b-10d), the server 300 reads an object discrimination data table, determines the object type (item) corresponding to the 3D object received, and assigns a unique object serial number to each 3D object by the determined type in the sequential order of registration.

Based on the registration information of the 3D object received from the general nodes (10b-10d), the administrative data generation server 300 assigns a unique storage number to a specific storage means (any one of the data servers 20) in the distributed file system 200 where the 3D data itself of the 3D object to be registered is stored. The assigned storage number is incorporated into the 3D object management data as one of the data items forming the 3D object management data to be associated with the 3D data itself, and is recorded in the blockchain 100 of 3D object management data. The information to specify the storage means that stores the 3D data itself may be stored in the second storage unit 310 of the administrative data generation server 300 with the information being associated with the storage number.

Next, the data structure of the 3D object management data according to one embodiment of the invention will be described. The 3D data itself of the 3D object explained in the following refers to a case in which the 3D data itself is used when a structure in an urban area at a certain point on the earth is displayed as a 3D image on the screen of a display device. The 3D object management data according to the invention may be applied to other cases without being limited to this case.

Figure 3:
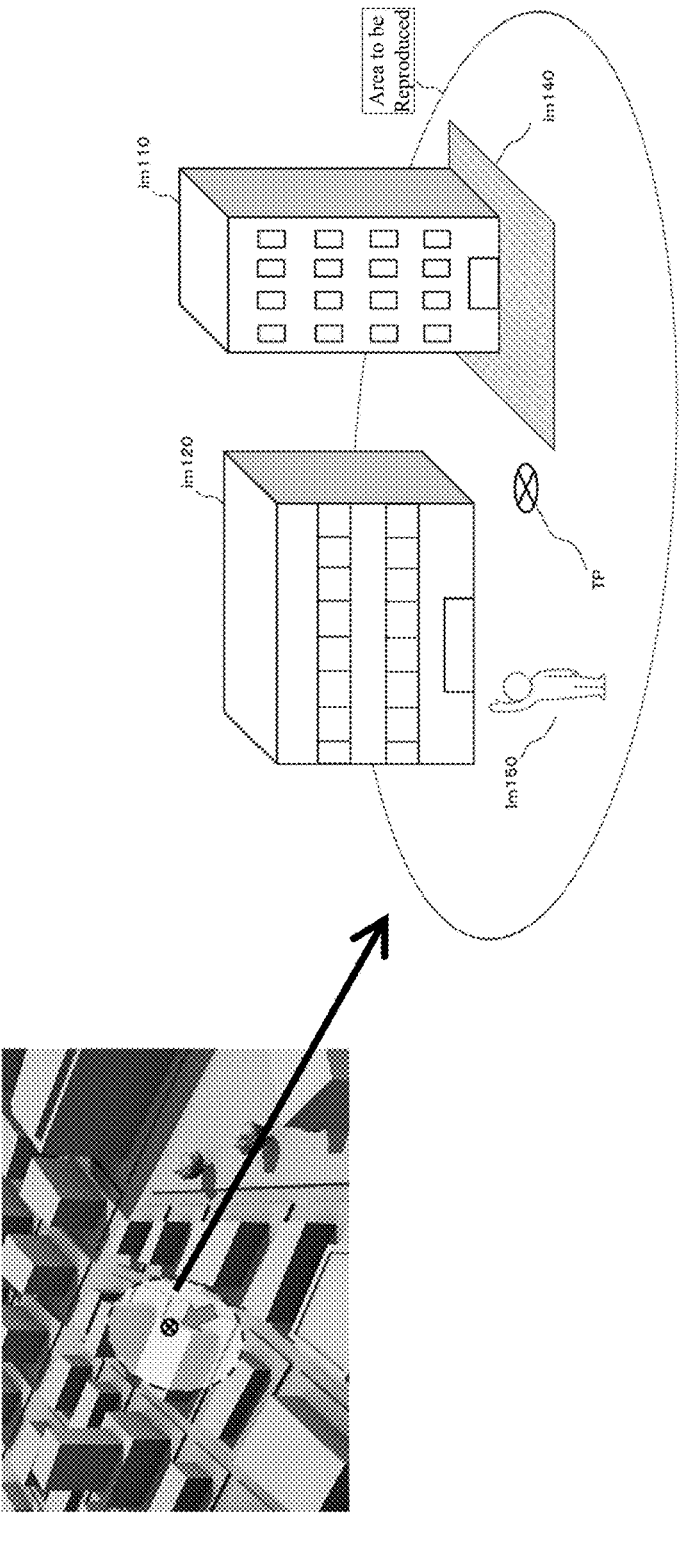
FIG. 3 is an example drawing of an urban landscape specified by 3D object management data according to one embodiment of the invention.

FIG. 3 is an example drawing of 3D images of structures in an urban area specified by the 3D object management data according to one embodiment of the invention. FIG. 3 illustrates an example where if a user or a general node designates a specific point TP by using a geodetic position or coordinates to the blockchain 100 of 3D object management data, the 3D data itself is acquired using the 3D object management data according to this embodiment, wherein the 3D data itself is used to display 3D images of real buildings within a certain range from the specified point (an area within a radius of several tens to several hundreds of meters, indicated by a solid circle), and objects (im 110-im 150) such as structures and people that are virtually placed in that area. The features of the invention for searching for 3D objects located within a certain range from a specified point and acquiring the 3D object management data corresponding to the objects are described later.

Figure 4:
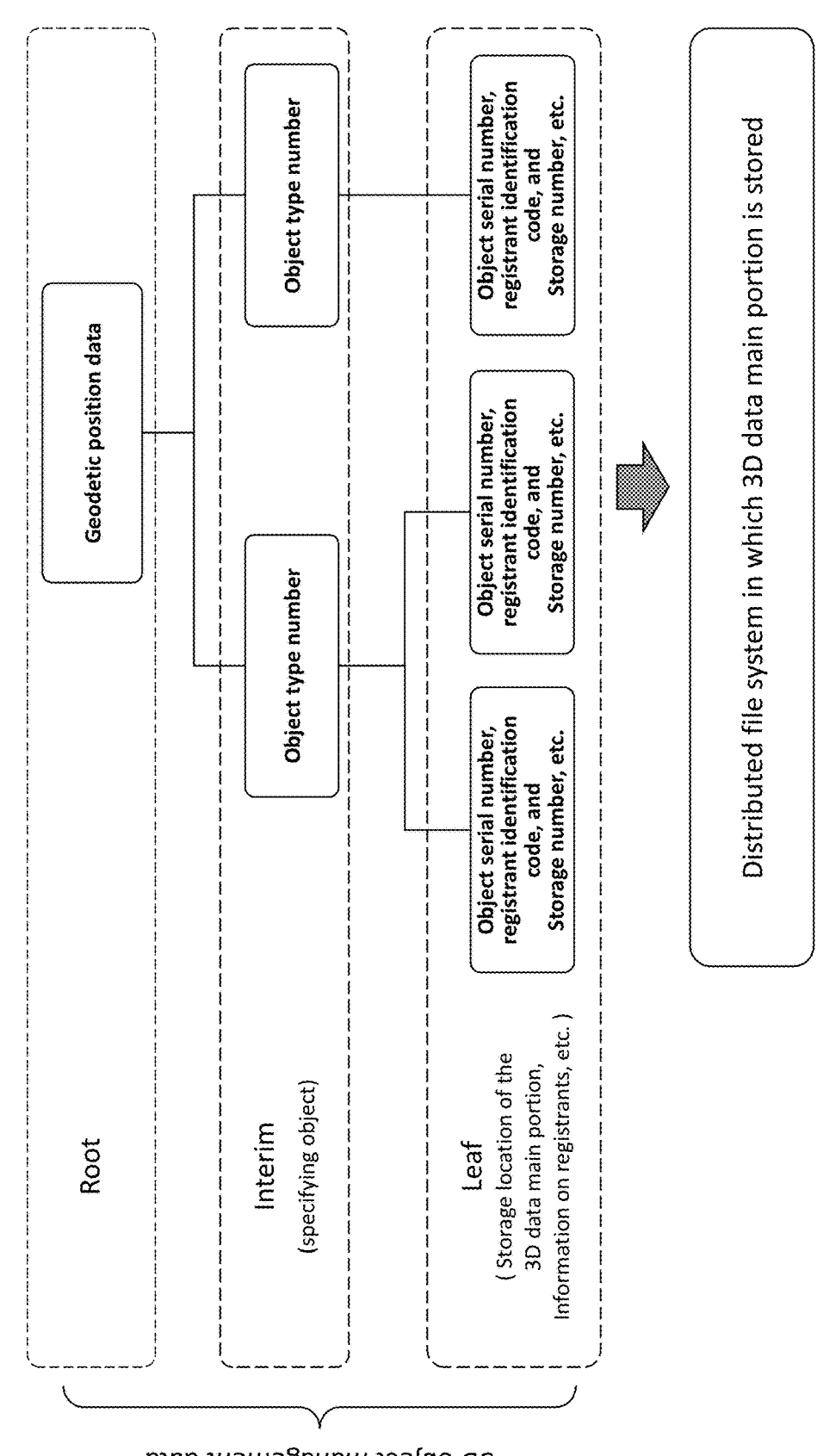
FIG. 4 is an example configuration of the data structure of 3D object management data according to one embodiment of the invention.

FIG. 4 is an example configuration of the data structure of 3D object management data according to one embodiment of the invention. The 3D object management data is individually generated for the 3D data and is recorded in the blockchain 100 of 3D object management data separately from the data itself of the 3D data. Because of this, after a user has registered in the 3D object distributed management system 1 according to this embodiment a 3D object digitized from the physical solid in the real world or a 3D object created on a computer, other users can search the 3D data specifying the 3D shape of the 3D object to be registered. The 3D object management data is updated as needed according to changes occurring in the 3D data itself of the registered 3D objects. The 3D object management data is also updated when the location (existing position) of a registered 3D object has been changed.

In other words, the 3D object management data is not updated together with the 3D data itself of the 3D object to be registered in a state where the 3D object management data is directly coupled to the 3D data itself of the 3D object to be registered. Rather, only the history of changes that have occurred in the 3D data itself of the registered 3D object and/or in the existing position of the 3D object is recorded in the 3D object management data. Accordingly, since the 3D object management data does not contain 3D data having a large amount of data, there is an advantage that the amount of calculation required to add blocks to the blockchain due to updating (adding blocks configured by updated 3D object management data) is small. This makes it possible to record in the blockchain 3D object management data reflecting the changes in the position of registered 3D objects and in the 3D data itself in almost real time (within seconds to minutes after uploading).

By using the 3D object management data having the data structure according to the invention, a user (node) can acquire the authentic and latest 3D data itself corresponding to the specified point from the storage location of the 3D data itself of the 3D object on the network, that is, from the storage means in which the 3D data itself is stored.

Referring to FIG. 4, the 3D object management data according to one embodiment of the invention is used to synchronize 3D objects created on the computer with 3D objects digitized from the physical solids in the real world at the geodetic location corresponding to the real world, so that both the created 3D objects and the 3D objects representing the physical solids in the real world are displayed as 3D images on the screen of the display device. In order to achieve this, the 3D object management data according to one embodiment of the invention is configured to have a tree-like data structure that includes (1) geodetic position data of a specific point on the earth used as an index for retrieval, which is a root node, (2) a plurality of object type numbers, which is data for object discrimination to specify the type of 3D object to be registered, in the one lower intermediate node than the root node, and (3) data containing data items described later to specify the storage location of the 3D data itself representing the relevant 3D object and the registrant (that is, preparer, creator, or owner) of the data, in the further lower leaf node.

In the 3D object distributed management system 1 according to this embodiment, only the registrant is authorized to perform update or change operations regarding the registered 3D object.

FIG. 5 shows an example of the data structure of 3D object management data according to one embodiment of the invention. Referring to FIG. 5, 3D object management data 401 of this example is composed of a tuple that includes the following data: (1) an object type number that specifies the type of a 3D object, which is associated with geodetic position data forming the root node; (2) an object serial number that is added to each 3D object whose type has been specified in a sequential order; (3) orientation data indicating the direction (orientation) that the 3D object is facing; (4) a storage number to specify the computer where the 3D object is stored; (5) a registrant identification code to identify the registrant of the 3D object; and (6) the latest updated date and time (registration date and time for new registration) of the 3D object.

In the 3D object distributed management system 1 according to this embodiment, among the 3D object management data having the previously-mentioned data structure, the portion of the 3D object management data excluding the geodetic position data forming the root node and the object type number below the root node are hashed at the registrant's node (computer) using a predetermined hash function. The obtained hash value is combined with the 3D data itself of the 3D object to be registered at the registrant's node (computer) (see 402 of FIG. 5), and said 3D data itself of the 3D object to be registered is stored in a data server 20 of the predetermined distributed file system 200, the data server 20 being specified by the registrant. The storage means in which the 3D data itself is stored is not limited to a distributed file system.

Meanwhile, the 3D object management data is recorded in a blockchain 100 of 3D object management data (see 403 of FIG. 5). At this time, the 3D object management data is recorded after the hash value corresponding to the portion of the previously-mentioned 3D object management data has been added to the 3D object management data. Thus, if a user wants to display on the screen of a given display device a 3D image of an object existing at a specific point or a 3D image of a 3D object to be set up at a specific point with the 3D image being synchronized with the real world, the user can obtain the authentic and latest 3D data of the 3D object in question from the 3D objects stored in a given distributed file system 200 by simply entering the geodetic location and current time of the specific point to search the blockchain 100 of 3D object management data. The current time may be inputted such that the time when the system receives the input of the geodetic position is automatically added to the input data instead of the input performed by a user.

In the 3D object distributed management system according to this embodiment, the 3D data itself of a registered 3D object is set to be updateable only by the registrant. If changes occur in the 3D object specified (represented) by the relent 3D data itself regarding its existing position or its 3D shape, the registrant can reflect those changes on the 3D object management data and the 3D data itself, i.e., update the 3D object management data and the 3D data itself, at any time or in real time.

Although it is possible for the user to change the arrangement of the acquired 3D objects on the user's computer, it is not possible for the user to tamper with the original 3D data itself, and even if the original 3D data itself is tampered with, the authenticity of the data can be determined by the historical information in the blockchain.

If the 3D object is a real movable solid (or a moving body), the node (computer) of a registrant can be programmed to execute a function to update the geodetic position data of the 3D object management data in real time based on position detection data from a position sensor or other devices connected to its node.

The following is an example of the operation of a 3D object distributed management system according to one embodiment of the invention.

Figure 6:
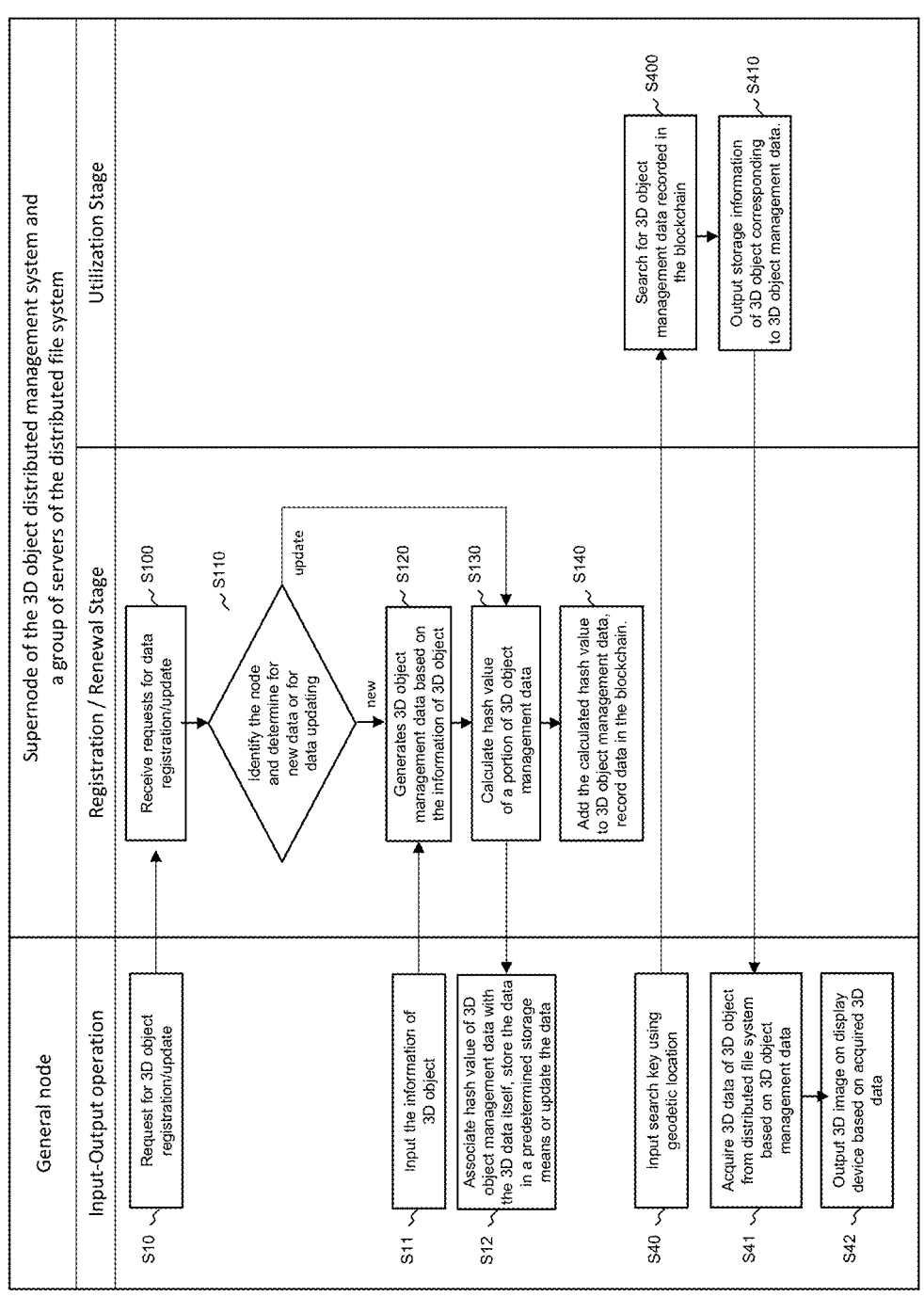
FIG. 6 is a flowchart showing the overall structure of each operating stage of the 3D object distributed management system according to one embodiment of the invention.

FIG. 6 is a flowchart showing the overall structure of each operating stage of the 3D object distributed management system according to one embodiment of the invention.

Described in the following are the general operations performed by a general node 10b and a supernode 10A to output a 3D image representing a 3D object. If a general node 10b sends a request for registration or updating of data to blockchain 100, a supernode 10A performs predetermined processing in (i) a data registration or updating stage, and (ii) a data utilization stage in response to the request.

After this process, a 3D image representing a 3D object of a point specified by the general node 10b is outputted to the general node 10b, which originally requested registration or updating of data. The method for distributed management of 3D objects according to the invention includes the following steps, in which each of the operations described in the following are performed.

In the registration/updating stage shown in FIG. 6, if a general node 10b sends a request for registration of a 3D object to blockchain 100 of 3D object management data of the 3D object distributed management system 1 (step S10), a supernode 10A among the group of computers forming the blockchain 100 receives the request as described in previous (step 100). The supernode 10A identifies the node based on the received request, and determines whether the request is for new data or for updating of data (step S110).

In the case that the request is for new data, if the information of a 3D object is inputted (transmitted) to the supernode 10A from the general node 10b (step S11), based on the inputted 3D object information, referring to a predetermined data table, the supernode 10A determines the object type number corresponding to the type of the 3D object and the object serial number assigned in the sequential order of registration by the type of the 3D object. The supernode 10A further generates 3D object management data containing the data items shown in FIG. 5 as an example (step S120).

The 3D object information used to generate 3D object management data includes, but is not limited to, the name of the registrant of the 3D object, the name of the object, the current position or installation position (in a geodetic system), the orientation of the 3D object, the information specifying the storage means in which the 3D data itself of the 3D object is stored, and the registration date.

Then, the supernode 10A applies a predetermined hash function to a portion of the generated 3D object management data (see 401 of FIG. 5) to calculate a hash value, and sends the calculated hash value to the general node 10b, which sent the request (step S130). The supernode 10A adds the calculated hash value to the 3D object management data (the hash value being connected to the data), and records said 3D object management data in the blockchain 100 of 3D object management data (step S140). Meanwhile, the general node 10b associates the 3D object management data, a portion of which has been hashed, with the 3D data itself of the 3D object (see 402 of FIG. 5), and stores said 3D data itself in a predetermined storage means designated by the registrant (step S12). The storage means in which the 3D data itself is stored may be a distributed file system 200 linked in advance to the 3D object distributed management system according to this embodiment, or any storage means that is configured to be accessible by users of this 3D object distributed management system.

In contrast, if the request is for an updating of data, the general node 10b itself performs updating of the applicable data items of the 3D object management data that is to be updated, which is recorded in the blockchain 100 of 3D object management data, and sends the updated data to the blockchain 100 of 3D object management data. The supernode 10A hashes a portion of the updated 3D object management data and the hash value is added to the original 3D object management data to be updated (see 403 of FIG. 5), as performed in step S130, and adds the calculated hash value to the 3D object management data (the hash value being connected to the data) to record said 3D object management data in the blockchain 100 of 3D object management data (step S140), and sends the newly calculated hash value to the general node 10b, which performed the updating of data. Then, the general node 10b associates the hash value corresponding to the portion of the 3D object management data that have been updated with the 3D data itself of the relevant 3D object, and stores said 3D data itself (updates the 3D data itself) in a predetermined storage means designated by the registrant (step S12).

The previously-mentioned updating stage of the 3D object can be repeated in real time or in optional timing whenever the existing position (or installation position) of the relevant 3D object has moved or the shape of the relevant 3D object has changed.

Next, in the utilization stage shown in FIG. 6, for example, if a search key including geodetic position data specifying a specific point is inputted (transmitted) from a general node 10c to the blockchain 100 of 3D object management data (step S40), the corresponding 3D object management data is searched in the blockchain 100 based on the inputted geodetic position (step S400). At this time, the application program (e.g., smart contract) for using the 3D object distributed management system 1, which is installed in advance, is executed at the general node 10c, so that the procedure of searching for 3D objects located within a certain range from a specified point is executed, the procedure being incorporated into the application.

The blockchain 100 of 3D object management data outputs (responds) the 3D object management data corresponding to the inputted geodetic position data to the general node 10c, which sent the request (step S410). The outputted 3D object management data is associated with the information including the storage number of the storage means (any one of the data servers 20 in the distributed file system) in which the corresponding 3D data is stored.

Based on the 3D object management data acquired from the blockchain 100 of 3D object management data, the general node 10c specifies the storage means (e.g., a data server in a distributed file system) in which the 3D data itself of the 3D object located at the specified point (and the area within a certain range from the point) is stored, and acquires the relevant 3D data itself of the 3D object from the specified storage means (data server) (step S41). Then, based on the acquired 3D data itself and 3D object management data, the general node 10c generates a 3D image of the relevant 3D object, and displays the 3D image on the screen of a display device so that the 3D image is synchronized with the real world at the specified point (step S42).

Next, the other applications of 3D object management data according to one embodiment of the invention are described. The 3D object management data explained as follows is an example where the data is applied to a flight of an unmanned aerial vehicle (also called a drone). In this example, the data is used to determine the route of the vehicle based on 3D data of 3D objects, which are a group of digitized buildings in a certain urban area, which ensures a safe and stable flight of the vehicle.

In this application example, a drone flight path is created by acquiring the 3D data representing the 3D shapes of buildings in the urban area where the drone is scheduled to fly from the 3D object distributed management system 1 shown in FIG. 1.

FIG. 7 is a diagram that shows an example configuration of a drone flight management system in another application of 3D object management data according to one embodiment of the invention. In the flight management system according to this application example, a drone 500 is connected with a flight path generator 600 via a wireless network 7.

Figure 8:
FIG. 8 is a drawing that shows an example of a flight path created by a flight path generator according to another application of the invention.

FIG. 8 is a drawing that shows an example of a flight path created by a flight path generator according to another application example of the invention.

The flight path generator 600 represents the flight space by means of a plurality of 3D spaces, in which the drone 500 flies. The flight path generator 600 creates flight paths in each 3D space based on 3D data of 3D objects, which are digitized from the buildings that physically exist in each 3D space. In this case, the flight path generator 600 acquires the 3D data corresponding to each 3D space (A1, A2) from the 3D object distributed management system 1 according to one embodiment of the invention described earlier.

The drone 500, which is provided with a control unit, a position information acquisition unit, a memory unit, and a wireless communication unit (not shown), flies from the starting point P1 to the destination P2 using route information recorded in the memory unit.

The flight path generator 600 is formed by a general computer. The generator 600 includes a control unit 601, which has devices including a central processing unit, ROM and RAM (not shown), performing various data processing and control by having a predetermined computer program executed; a 3D data acquisition unit 602, a flight path determination unit 603, a flight position tracking unit 604, each of which functions by a predetermined computer program executed on the control unit; a wireless/wired communication unit 605, which performs wireless communication with the drone and performs communication with the 3D object distributed management system 1 through a communication network 5 such as the Internet; and a memory unit 606.

In this application example, the 3D data acquisition unit 602 of the flight path generator 600 functions as a general node in the 3D object distributed management system 1. In order to create a flight path by the flight path creator 600, by inputting the geodetic positions of major flight points, the 3D data acquisition unit 602 can acquire from the 3D object distributed management system 1 the current authentic 3D data of 3D objects (e.g., buildings and hills) located in the 3D spaces (A1, A2) within a certain range (e.g., within a radius of several tens to several hundreds of meters) from the respective geodetic positions based on the inputted geodetic position data. The procedures for acquiring 3D data are the same as the method described with reference to FIG. 6, so the explanation is omitted here.

The function of the 3D data acquisition unit 602 of the flight path generator 600 may be substituted by a computer forming a node of 3D object distributed management system 1, which is separate from the flight path generator 600.

The flight path determination unit 603 determines a flight path based on the 3D data of the 3D objects acquired by the 3D data acquisition unit 602, and the flight position tracking unit 604 acquires the position information of the drone 500, which is transmitted wirelessly from the position information acquisition unit of the drone 500 via the wireless/wired communication unit 605. The flight path determined by the flight path determination unit 603 is stored in the memory unit 606, and may also be transmitted to the drone 500 in advance to be stored in the memory unit of the drone 500.

The flight path generator 600 according to this application example does not need to acquire wide-area 3D map information having a huge amount of data in advance, whereby the flight path to be created can avoid the discrepancies between the current actual state and the acquired data, which results from the generally long update interval of the 3D map information.

Next, the other application example of 3D object management data according to one embodiment of the invention is further explained. The example application of the 3D object management data described as follows illustrates how the data is used to simulate the manufacture and management of products in a concrete product manufacturing yard (workshop).

In this application example, a mirror world that reproduces a concrete product manufacturing yard is used. In the actual manufacturing yard, multiple concrete products are manufactured, and each of the products is placed in a specific location in the yard to be shipped in a specific order. Before manufacturing the products, simulation including in what order each product is moved, through what route each product is moved, and in what manner heavy machinery is used is performed on a computer. Based on the simulation, the products are manufactured and managed.

In the case that the simulation described previously is performed using 3D data, the 3D data representing the 3D shape of the manufacturing yard or products should be managed using 3D object management data having the data structure according to the invention. This allows the 3D data required for simulation to be minimum, thereby significantly reducing the time and operating costs required for data processing to collect 3D data and create 3D images. In addition, by recording the 3D data of the products to be manufactured in the 3D object distributed management system according to the invention, the storage status of the products after manufacturing can be published as 3D data of the products that are specified by position information (geodetic position data). This provides an advantage, for example, of making it easier for the manufacturer to coordinate with related companies such as transportation companies.

Figure 9:
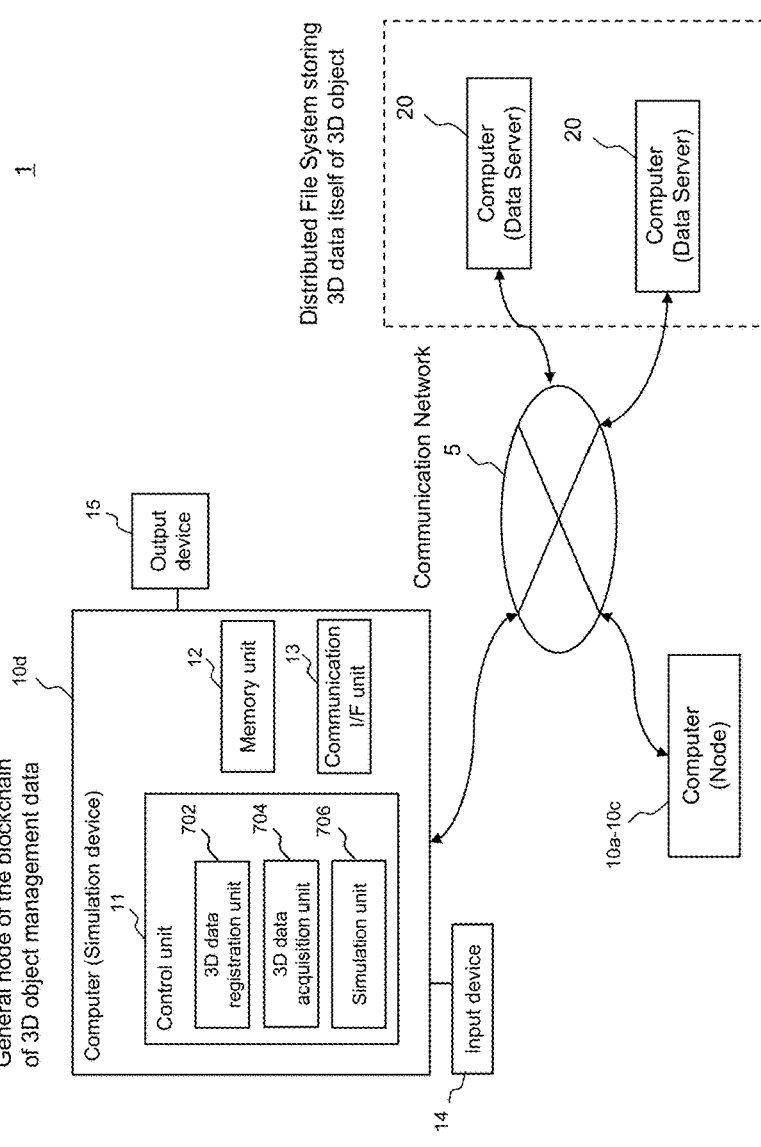
FIG. 9 is a diagram that shows an example configuration of a product manufacturing management simulation device according to yet another application of the invention.

FIG. 9 is a diagram that shows a configuration of a product manufacturing management simulation device according to yet another application example of the invention. By implementing a simulation means on a computer working as a general node 10*d* connected to the 3D object distributed management system 1 according to the invention, the computer operates as a manufacturing management simulation device according to this application example. The implementation of the simulation means may be performed on a separate simulation device coupled to the general node 10*d*, without being limited to this. The general node 10*d* is connected to the 3D object distributed management system 1 via a communication network 5 that supports P2P network connections.

The general node 10*d*, which also serves as a manufacturing management simulation device, is formed by a general computer. The general node 10*d* includes a control unit 11, which has devices including a central processing unit, ROM and RAM (not shown), and performs various data processing and control by having a predetermined computer program executed; a 3D data registration unit 702, a 3D data acquisition unit 704, and a simulation unit 706, each of which functions by the predetermined programs executed on the control unit; a memory unit 12 that stores various programs and data; a communication interface (I/F) unit 13, by which network connections between the general node 10*d* with the other nodes 1 and servers 20 in 3D object distributed management system are made; an input device 14 that receives commands from users; and an output device 15, which is formed by a display means such as a display device that displays operation screens generated by the control unit 11, and 3D images based on 3D data received from servers 20.

Figure 10:
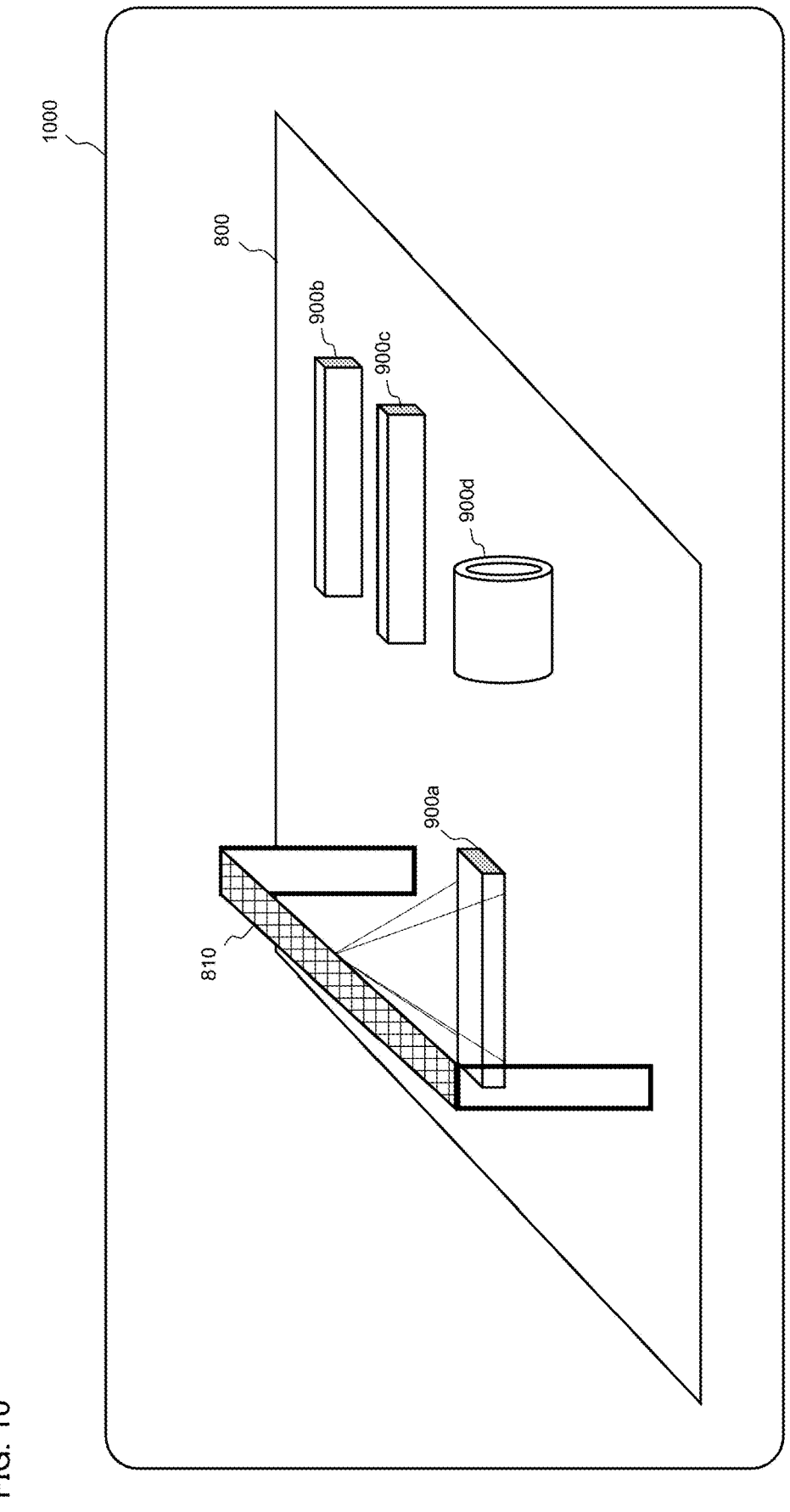
FIG. 10 is a drawing that shows an example of a manufacturing yard image displayed on the screen of an output device of a manufacturing management simulation device according to yet another application of the invention.

FIG. 10 is a drawing that shows an example of a manufacturing yard image displayed on the screen of an output device of a manufacturing management simulation device according to yet another application of the invention.

Shown on a screen 1000 of the output device 15 are heavy machinery (a crane) 810 and the manufactured concrete products (900*a*-900*d*) placed inside a real manufacturing yard 800. These concrete products are recorded in the 3D object distributed management system 1 by the 3D data registration unit 702, wherein the concrete products are associated with the 3D object management data having the data structure according to the invention. This allows each concrete product to be managed in the form of 3D data, by which each concrete product can be retrieved by the current position of the product.

If geodetic position data (geodetic coordinates) specifying a particular manufacturing yard 800 is inputted from the input device 14, the 3D data acquisition unit 704 acquires 3D data of structures including concrete products and heavy machinery existing in an area within a certain range from the specified point (an area corresponding to the site of the manufacturing yard) using 3D object management data according to the invention.

The simulation unit 706 uses the 3D data acquired by the 3D data acquisition unit 704 to perform simulation based on user instructions inputted from the input device 14. For example, in the case that a concrete product 900a is moved by heavy machinery (crane) 810 installed in the manufacturing yard 800, simulation is performed using images from 3D data to determine which position in the manufacturing yard 800 is best to place the product 900a, based on the positions of the other concrete products (900b-900d) in the manufacturing yard 800. In this simulation, the concrete product 900a to be moved may be a 3D object of a pre-manufactured concrete product, which does not yet exist.

After each concrete product has been actually moved based on the simulation, the 3D data registration unit 702 updates the 3D object management data of each moved concrete product based on the data of the position where each product currently exists, and records the data in the 3D object distributed management system 1. The position to which the concrete product is to be moved is not limited to within the manufacturing yard 800, but may be the job site where the product is used. Thus, each concrete product can be historically managed after its manufacture, including the position (or place) where the product is used.

As explained previously, by using 3D object management data having the data structure described previously, the 3D object management system can significantly reduce the amount of data processing required to update 3D object management data even if there are changes in the existing position or arrangement of the 3D objects represented by the 3D data. This is because the 3D data itself, which has a large data volume, is not included in the 3D object distributed management system. Furthermore, when using 3D data, since the 3D data to be acquired is limited to the data for the area within a certain range from a specified point, the amount of the data transferred from the distributed file system is small, resulting in the efficient generation of 3D images. In addition, since a portion of the 3D object management data is hashed, even if the data is illegally tampered with, such an event can be detected, so that authentic data can be used.

While particular embodiments of the invention have been explained with reference to the drawings, it will be appreciated by those skilled in the art that the invention is not limited to the embodiments described previously, but can be modified and implemented in various ways within the scope that does not depart from the technical scope of the invention.

DESCRIPTION OF REFERENCE SIGNS

1. 3D object distributed management system
5. communication network
7. wireless network
10A. supernode
10b.-10d. general node
11., 101., 301. control unit
12., 606., storage unit
13., 120., 320. communication interface (I/F) unit
14. input device
15. output device
20. group of computers (data servers)
30. external device
100. blockchain
105. API server
110. first storage unit
200. distributed file system

16

300. management data generation server
310. second storage unit
500. drone
600. flight path generator
601. control unit
602., 704. 3D data acquisition unit
603. flight path determination unit
604. flight position tracking unit
605. wireless/wired communication unit
606. storage unit
702. 3D data registration unit
706. simulation unit
800. manufacturing yard
810. heavy machinery (crane)
900a.-900d. concrete products
1000. screen

The invention claimed is:

1. A method for managing 3D objects by distributed management using a plurality of computers, the method comprising:

by any one of the plurality of computers, preparing 3D data to specify a 3D shape of a 3D object digitized from a physical solid in the real world, or a 3D shape of a 3D object created on a computer;

generating 3D object management data to be associated with the prepared 3D data;

calculating a hash value by applying a predetermined hash function to a portion of the 3D object management data;

adding the calculated hash value to the 3D object management data to record said 3D object management data in a blockchain formed by the plurality of computers; and associating the other portion of the 3D object management data to which the hash function is not applied and the calculated hash value with the 3D data to store said 3D data in a predetermined storage means managed in a distributed manner separately from the blockchain;

wherein the 3D object management data comprises, a registrant identification code to identify a registrant of the 3D object to be registered in the blockchain, an object type number to specify a type of the 3D object to be registered, an object serial number assigned to a 3D object whose type has been specified in sequential order of registration;

a storage number to specify a storage means storing 3D data to specify a 3D shape of the 3D object to be registered, geodetic position data to specify a current position of the 3D object to be registered, orientation data to indicate a direction in which the 3D object to be registered is facing, and data of updated date and time of the 3D object to be registered, wherein the blockchain is a blockchain of a predetermined type, in which each of the plurality of computers serves as a node, and the implementation of the blockchain is performed by a data processing application that is provided to each of the plurality of computers, and wherein the 3D object management data is recorded in the blockchain with the geodetic position data serving as a search key, and the other part of the 3D object management data to which the hash function is not applied includes geodetic position data.

2. A 3D object distributed management system that manages a 3D object digitized from a physical solid in the real world and a 3D object created on a computer in a distributed manner such that the former and the latter are synchronized with the real world, the 3D object distributed management system comprising:

a plurality of computers that makes up a blockchain platform in which the 3D object management data is to be recorded; and a storage means managed in a distributed manner separately from the blockchain platform, the storage means storing 3D data to specify a 3D shape of the 3D object digitized from a physical solid in the real world and a 3D shape of the 3D object created on a computer, each of the plurality of computers that makes up the blockchain platform comprising:

a means for generating the 3D object management data to be associated with the 3D data to specify a 3D shape of the 3D object digitized from a physical solid in the real world or a 3D shape of the 3D object created on a computer; and a means for calculating a hash value by applying a predetermined hash function to a portion of the generated 3D object management data, wherein each of the plurality of computers that makes up the blockchain platform adds the calculated hash value to the 3D object management data to record said data in a blockchain of the blockchain platform, and associates the other portion of the 3D object management data to which the hash function is not applied and the calculated hash value with the 3D data to store said 3D data in the storage means, the 3D object management data comprising:

a registrant identification code to identify a registrant of the 3D object to be recorded in the blockchain, an object type number to specify a type of the 3D object to be registered, an object serial number assigned to a 3D object whose type has been specified in a sequential order of registration, a storage number to specify the storage means storing 3D data to specify a 3D shape of the 3D object to be registered, geodetic position data to specify a current position of the 3D object to be registered, orientation data to indicate a direction in which the 3D object to be registered is facing, and data of updated date and time of the 3D object to be registered, wherein the blockchain platform is a blockchain platform of a predetermined type, in which each of the plurality of computers serves as a node, and the implementation of the blockchain platform is performed by a data processing application that is provided to each of the plurality of computers, and wherein the 3D object management data is recorded in a blockchain of the blockchain platform with the geodetic position data serving as a search key, and the other part of the 3D object management data to which the hash function is not applied includes geodetic position data.

* * * * *